Figure 1:
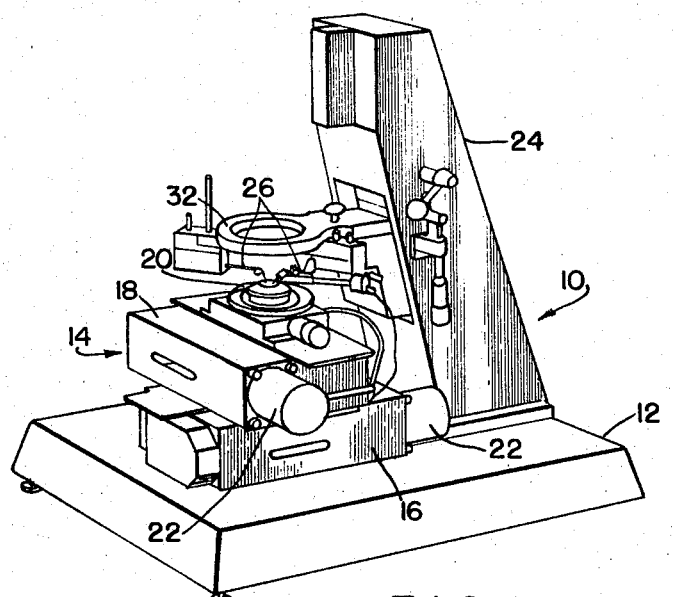

Aug. 27, 1968  M. WIESLER  3,399,363

PROBE AND MARKER HEAD

Filed May 2, 1966

INVENTOR.
MORDECHAI WIESLER
BY
Morse, Altman + Oates

ATTORNEYS

United States Patent Office 3,399,363
Patented Aug. 27, 1968

3,399,363
PROBE AND MARKER HEAD
Mordechai Wiesler, Lexington, Mass., assignor, by mesne assignments, to Teledyne, Inc., Hawthorne, Calif., a corporation of Delaware
Filed May 2, 1966, Ser. No. 546,919
7 Claims. (Cl. 335—270)

This invention relates generally to automatic probing mechanisms and more particularly is directed towards an electromagnetic actuator for automatic probing devices.

In co-pending application Ser. No. 478,902, filed Aug. 11, 1965, and entitled, "Automatic Probing Apparatus," there is disclosed a probe mounting mechanism employed with automatic test equipment in the testing of microelectronic devices such as integrated circuits, transistors, diodes and the like.

In automatic test equipment of the foregoing type, probing heads are mounted above a specimen such as a wafer of integrated circuits. An automatic positioning table of the sort disclosed in U.S. application Ser. No. 449,754 filed Apr. 2, 1965, moves the specimen incrementally along X and Y axes in the horizontal plane. At each indexed position a probe tip or tips contacts the circuit to perform test functions. In some cases inking devices are applied to place a spot of ink on a particular circuit to indicate a malfunction of the tested component.

Insofar as the specimens normally are quite small, there is usually a very limited area for the test probes and inking devices to operate. Where several probe and inking heads are organized over a single wafer, the components become quite crowded together so that there exists a limitation on the number and operation of test heads.

Accordingly, it is an object of the present invention to provide improvements in supporting heads for probe tips and the like.

Another object of this invention is to provide an automatic head assembly adapted to move a probe tip or the like to and away from a contact point in a quick and precise fashion.

A further object of this invention is to provide an automatic head for probe tips and the like wherein the tips are actuated to and away from the test contact to permit a plurality of head assemblies and probe tips to operate in a confined area.

More particularly, this invention features an automatic head assembly for probe tips and the like comprising a resilient supporting system including a pair of spaced springs disposed at an angle with respect to one another and carrying the probe tip or other device. An actuating system including a coil is adapted to displace the resiliently suspended head through an arc so as to bring the tip against the specimen and retract the tip upon completion of the operation whereby two or more probes may be operated in closely spaced relation without interference.

Figure 2:
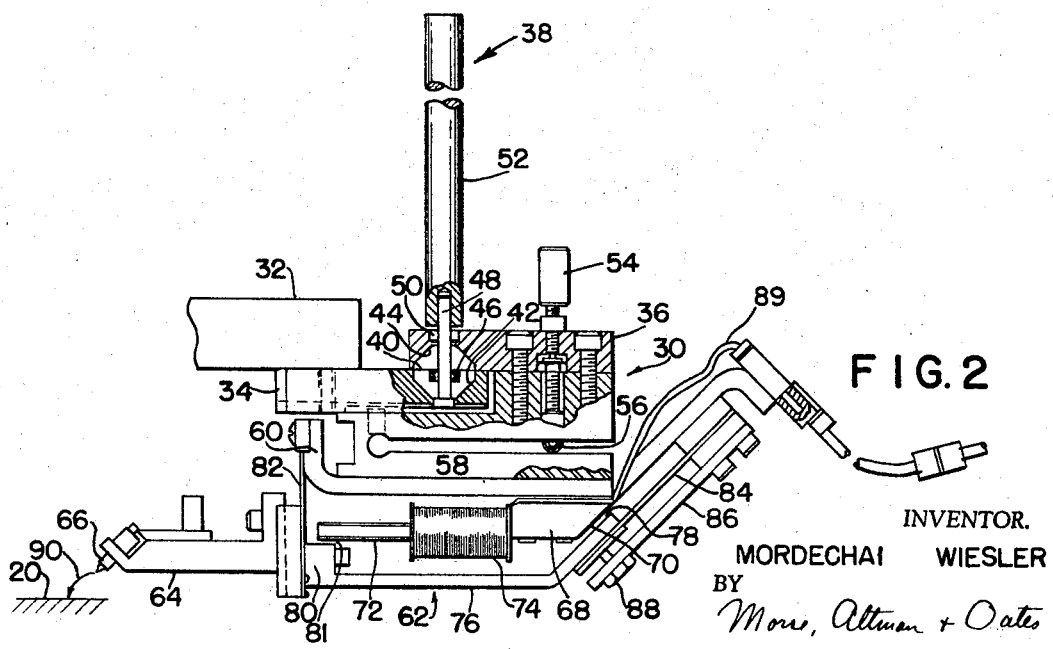

However, these and other features of the invention, along with further objects and advantages thereof, will become more fully apparent from the following detailed description of a preferred embodiment of the invention, with reference being made to the accompanying drawings, in which:

FIG. 1 is a view in perspective of an automatic test apparatus utilizing a pair of actuating heads made according to the invention, and, FIG. 2 is a sectional view in side elevation of an actuating head made according to the invention.

Referring now to the drawings the reference character 10 generally indicates a test stand of the sort more fully illustrated and described in co-pending application Ser. No. 449,754. The stand is generally organized about a base 12 supporting an automatic table 14 including X and Y slides 16 and 18, which are adapted to move according to a predetermined program along X and Y horizontal co-ordinates. In this fashion a specimen 20 mounted on the table may be moved in a step and repeat fashion into a number of indexed positions according to a predetermined schedule to carry out repetitive operations such as probing, welding, testing, marking and the like. The slides are actuated by stepping motors 22 through a screw feed drive to move the slides back and forth in the horizontal plane.

As shown in FIG. 1 the base 12 also carries an upwardly extending standard 24 which carries one or more test heads 26, to be described more fully below, along with other accessories.

Referring now more particularly to FIG. 2 of the drawings, the automatic probe head will now be described in detail. The upper portion of the probe head corresponds in construction and operation with the probe head assembly illustrated and described in co-pending application Ser. No. 478,902 referred to above. This probe head includes a bifurcated block 30 suspended from a bracket 32 by means of a positioning mechanism comprising a relatively fixed lower plate 34 and a slideable upper plate 36. The block is secured to the slideable upper plate 36 by means of screws and it will be seen that the extended left-hand portion of the block projects underneath the lower plate to slideably engage with it. This arrangement holds the upper plate to the lower plate.

The two plates are coupled to one another by means of a joy stick adjusting mechanism indicated at 38. This mechanism includes a split ball 40, the lower half ball is seated in a recess 42 formed in the top surface of the lower plate while the upper half ball is seated in recess 44 formed in the lower surface of the upper plate. The two half ball spheres are so confined as to allow a gap between them to achieve an overall oval shape rather than a true ball. Coil spring 46 is compressed between the ball halves urging the two balls apart. A pin 48 passes through a countersunk opening 50 formed in the upper plate opposite the recess 44. The lower end of the pin passes through the center of the upper ball half, through the coil spring and is fixed to the lower ball half. A handle 52 is attached to the upper end of the pin and by manipulating the joy stick through different angular movements, the upper plate may be laterally displaced to permit fine adjustment of the probe tip with respect to the workpiece through the horizontal plane.

In order to permit the probe tip to be raised or lowered with respect to the workpiece an adjusting screw 54 is provided. This screw is spring loaded and is threaded to the upper plate 36. The lower end of the adjusting screw passes down through the block 30 to bear on a slug trapped against a bearing ball 56. The bearing ball bears against a lower leg 58 of the bifurcated block whereby the lower leg may be biased to or away from the main portion of the block according to the position of the screw 54. Thus, the probe tip may be raised or lowered by control of the screw 54.

Carried by the lower leg 58 of the bifurcated block is a bracket 60 the left-hand end of which is bent at a 90° angle while the right-hand end is bent at a 45° angle. This bracket supports a magnetic actuator 62 which in turn supports a holder 64 for an inking head 66, probe tip or the like. Preferably, the tip is set at an angle with respect to the holder for reasons that will presently appear.

The magnetic actuator 62 includes a core structure 68 having a relatively large right-hand block portion formed with a beveled face 70. The core also includes an elongated finger portion 72 carrying a coil 74.

Suspended in normally spaced relation from the core structure is an armature 76 extending generally parallel to the core with the right-hand portion being bent at a 45° angle to define an air gap 78 with the beveled face 70 of the core 68 at the right-hand end of the armature. The left-hand end of the armature is formed with an enlarged boss 80 also defining an air gap 81 with the left-hand end of the core. The armature is suspended from the bracket 60 by means of a pair of straight flat leaf springs 82 and 84. As shown, the spring 82 supports the left-hand end of the armature and is secured to the right angle extension of the bracket 60 whereby the spring 82 is perpendicular to the bracket and to the armature. The spring 84, on the other hand, is secured to the diagonal extension of the bracket and engages the 45° angular right-hand portion of the armature 76. Thus, the leaf spring 84 lies at a 45° angle with respect to the spring 82. It will also be noted that the plate 86 is secured to the right-hand end of the bracket and is provided with a screw 88 opposite the 45° section of the armature. This screw provides an adjustable return stop for the armature.

The unit is operated by energizing the coil 74 through leads 89. When the coil is energized, the armature is attracted towards the core and moves under the control of the leaf springs 82 and 84. By reason of the orientation of the springs, the armature undergoes a pivoting movement both upward and to the left as viewed in FIG. 2. It will be understood that the energization of the coil attracts the armature towards the core so that the air gap 78 of the right-hand end is closed by the right-hand end of the armature being brought against the beveled core face.

The armature, by reason of the novel spring suspension, undergoes a movement upward and to the left as viewed in FIG. 2. The right-hand end of the armature is attracted towards the beveled face of the right-hand portion of the core when the coil is energized. The left-hand end of the armature is thus moved to the left as the leaf-spring 82 permits a deflection to the left of the probe holder and armature. This movement of the armature causes the probe holder 64, along with the probe tip or inking device, to traverse through a small arc indicated at 90 which is downward and to the left so that the tip is brought down against the surface of the work. The downward movement results from the spring 82 serving as a pivot point for the holder and armature as the right-hand end of the armature is raised when the coil is energized. When the coil is deenergized the springs return the armature, the holder and the tip to the idle position illustrated.

By being able to displace the tip through a precisely defined arc it is thus possible to group together a plurality of probes, markers and other test instruments within a confined area. For example, three or four such instruments may be organized about a common point and actuated sequentially. The instruments may operate rapidly without interfering with one another even though all of the instruments are arranged to contact the workpiece at substantially the same point or closely adjacent points. Thus several probes and several inking devices may be working at the same time on a single integrated circuit, for example. This is particularly useful for complex circuits where a number of tests must be made for each circuit. Also, several different marking devices may be employed to indicate different malfunctions. All of these may be carried out in a very confined space without interference insofar as the tips are adapted to move and away from the point of contact in a precisely defined path.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

1. An automatic head for probing, marking and the like comprising
   (a) a support,
   (b) a coil fixed to said support,
   (c) a pair of flat springs mounted to said support one at either end of said coil,
   (d) one of said springs being disposed perpendicular to the axis of said coil and the other being disposed at an acute angle relative thereto,
   (e) an armature supported at spaced points by said springs in spaced relation to said coil,
   (f) a tip means mounted to said armature and extending beyond said perpendicular spring whereby said tip means will traverse an arc upon said armature being displaced by energization of said coil.

2. An automatic head according to claim 1 wherein said armature is substantially parallel to the axis of said coil and is tilted towards said coil upon energization thereof.

3. An automatic head according to claim 2 including a core extending coaxially through said coil, said core being formed at one end with a bevelled face parallel to said other spring, said armature being formed with an angularly offset end portion engaging said other spring and disposed normally in spaced opposition to said face to define an air gap therewith.

4. An automatic head according to claim 3 including adjustment means for selectively varying said air gap.

5. An automatic head according to claim 1 wherein said angle is substantially 45°.

6. An automatic head, comprising
   (a) a support,
   (b) a coil and core fixed to said support,
   (c) a pair of flat springs mounted to said support one at either end of said core,
   (d) one of said springs being disposed perpendicular to the axis of said coil and the other being disposed at an acute angle relative thereto,
   (e) a movable armature mounted between said springs in spaced parallel relation to said core and coil,
   (f) said armature being formed with an angularly offset end portion connected to said angularly disposed spring and positioned oppositely one end of said core,
   (g) a tip means mounted to said armature and extending beyond the end thereof connecting said perpendicular spring whereby said tip means will traverse an arc upon the angularly offset end of said armature being attracted to said one end of said core by energization of said coil.

7. An automatic head, comprising
   (a) a support,
   (b) a first magnetizable member mounted to support,
   (c) a pair of spaced flat springs mounted to said support and angularly inclined with respect to one another,
   (d) a second magnetizable member carried by said springs in spaced relation to said first member,
   (e) a coil mounted on one of said members, and,
   (f) a tip means mounted to said second member whereby said tip means will traverse an arc upon said second member being displaced by energization of said coil.

References Cited

UNITED STATES PATENTS

| | | | |
|---|---|---|---|
| 2,398,666 | 4/1946 | Reason | 73—105 |
| 2,471,009 | 5/1949 | Reason | 73—105 |

BERNARD A. GILHEANY, *Primary Examiner.*

GEORGE HARRIS, *Assistant Examiner.*